(12) United States Patent
Harashima

(10) Patent No.: US 9,150,207 B2
(45) Date of Patent: Oct. 6, 2015

(54) DIAPHRAGMS FOR VEHICLE BRAKES

(75) Inventor: Nobuyasu Harashima, Tokyo (JP)

(73) Assignee: FUJIKURA RUBBER LTD., Tokyo (JP)

(*) Notice: Subject to any disclaimer, the term of this patent is extended or adjusted under 35 U.S.C. 154(b) by 0 days.

(21) Appl. No.: 13/807,371

(22) PCT Filed: Jul. 27, 2011

(86) PCT No.: PCT/JP2011/067721
§ 371 (c)(1),
(2), (4) Date: Feb. 7, 2013

(87) PCT Pub. No.: WO2012/023431
PCT Pub. Date: Feb. 23, 2012

(65) Prior Publication Data
US 2013/0133992 A1 May 30, 2013

(30) Foreign Application Priority Data

Aug. 17, 2010 (JP) ................. 2010-182305

(51) Int. Cl.
*B60T 17/08* (2006.01)
*F16D 65/18* (2006.01)
(Continued)

(52) U.S. Cl.
CPC ............. *B60T 17/08* (2013.01); *F16D 65/183* (2013.01); *F16D 2121/08* (2013.01); *F16D 2125/12* (2013.01)

(58) Field of Classification Search
CPC ... B60T 17/08; F16D 65/183; F16D 2121/08; F16D 2125/12

USPC ........... 188/153 D; 303/9.76; 92/96, 97, 101, 92/98 D, 103 F
See application file for complete search history.

(56) References Cited

U.S. PATENT DOCUMENTS

| 5,262,092 | A | * | 11/1993 | Reeder et al. .................... 261/35 |
| 6,067,893 | A | * | 5/2000 | Drahusz, Jr. ................... 92/98 R |
| 6,103,048 | A | * | 8/2000 | Eady ............................ 156/250 |

(Continued)

FOREIGN PATENT DOCUMENTS

| JP | A-2000-238189 | 9/2000 |
| JP | A-2000-274529 | 10/2000 |

(Continued)

OTHER PUBLICATIONS

Nov. 8, 2011 International Search Report issued in Application No. PCT/JP2011/067721 (with translation).

(Continued)

*Primary Examiner* — Robert A Siconolfi
*Assistant Examiner* — Charles Poon
(74) *Attorney, Agent, or Firm* — Oliff PLC

(57) ABSTRACT

The vehicle brake-specific diaphragm of the invention includes a vessel-form member and a flange portion formed at a peripheral edge of an opening in the vessel-form member, wherein the vessel-form member and the flange portion are each formed of a rubber body including silicone rubber and a substrate fabric embedded in the rubber body, the substrate fabric including aramid short fibers or polyester fibers, and having a thickness of 0.25 mm or more. Accordingly, the inventive diaphragm does not only have durability during operation in both the high-temperature and the normal-temperature area but also exerts much better durability during operation in the low-temperature area.

16 Claims, 3 Drawing Sheets

(51) Int. Cl.
*F16D 121/08* (2012.01)
*F16D 125/12* (2012.01)

(56) References Cited

U.S. PATENT DOCUMENTS

| | | | |
|---|---|---|---|
| 6,205,907 B1* | 3/2001 | Douglass | 92/98 R |
| 6,212,996 B1* | 4/2001 | Savel et al. | 92/101 |
| 6,349,629 B1* | 2/2002 | Plantan et al. | 92/99 |
| 6,746,637 B1* | 6/2004 | Huss et al. | 264/135 |
| 7,931,130 B2* | 4/2011 | Ring | 188/153 D |
| 2005/0126390 A1* | 6/2005 | Fortin et al. | 92/103 F |
| 2007/0044653 A1* | 3/2007 | Stevenson et al. | 92/96 |
| 2010/0095920 A1* | 4/2010 | Morishima | 123/90.17 |
| 2010/0175550 A1* | 7/2010 | Rhoads | 92/101 |

FOREIGN PATENT DOCUMENTS

| | | |
|---|---|---|
| JP | A-2001-004025 | 1/2001 |
| JP | A-2003-172391 | 6/2003 |
| JP | A-2004-197260 | 7/2004 |
| JP | A-2004-281834 | 10/2004 |
| JP | A-2009-092194 | 4/2009 |
| JP | A-2010-007689 | 1/2010 |

OTHER PUBLICATIONS

Dec. 31, 2014 Office Action issued in Chinese Patent Application No. 201180039316.6.

Jun. 2, 2015 Office Action issued in Japanese Patent Application No. 2012-529558.

* cited by examiner

DIAPHRAGMS FOR VEHICLE BRAKES

ART FIELD

The present invention relates generally to a structure of a diaphragm adapted for use with vehicle brake assemblies that apply frictional force while held between discs rotating with wheels, and more particularly to a vehicle brake-specific diaphragm that does not only have durability during operation in both high-temperature and normal-temperature areas but also exerts much better durability during operation in a low-temperature area.

BACKGROUND ART

There are a variety of vehicle brakes adapted to slow down, stop, and keep railway vehicles or cars stopped. A caliper brake (disc brake) assembly that applies frictional force while held between discs rotating with wheels is now adopted as a brake structure for railway vehicles.

This caliper brake is broken down into two types: hydraulic braking and pneumatic braking. So far, hydraulic braking has been used primarily for the high-speed Shinkansen or Bullet Train; however, recent demands for reductions in the weight of vehicles have led to mounting demands for the adoption of pneumatic braking regardless of the old railway line or the Shinkansen.

Such a pneumatic braking type caliper brake assembly usually includes an actuator that displaces a brake pad toward or away from discs. Used for that actuator is a diaphragm for transmitting pressure to pistons, which diaphragm is operable to press the brake pad against the discs via various members or parts. Prior arts relevant to brake assemblies include JP(A) 2009-92194 as an example.

The diaphragm used with such a caliper brake is required not only to withstand frictionally generated heat and repetitive operations but also to have cold resistance good enough to stand up to cold-area specifications. Referring especially to the diaphragm used as an actuator that operates as a vitally important part of braking, there is still a great demand for a vehicle brake-specific diaphragm that has much better durability, although there is no end to improvements in such a variety of durability requirements as described above. Prior arts relevant to the present invention, for instance, include JP(A)'s 2004-197260 and 2004-281834, although there is no explicit reference to brake-specific diaphragms.

The situations being like this, the present invention has for its object to provide a diaphragm for vehicle brakes (floating caliper brakes) that does not only have durability during operation in both high-temperature and normal-temperature areas but also exerts much better durability during operation in a low-temperature area.

DISCLOSURE OF THE INVENTION

According to the present invention, such an object is accomplished by the provision of a vehicle brake-specific diaphragm including a vessel-form member and a flange portion formed at a peripheral edge of an opening in said vessel-form member, wherein said vessel-form member and said flange portion are each formed of a rubber body comprising silicone rubber and a substrate fabric embedded in said rubber body, said substrate fabric comprising aramid short fibers or polyester fibers, and having a thickness of 0.25 mm or more.

In a preferable embodiment of the inventive vehicle brake-specific diaphragm, said substrate fabric has a thickness of 0.25 to 0.6 mm.

In a preferable embodiment of the inventive vehicle brake-specific diaphragm, said substrate fabric comprises a plain woven fabric texture.

In a preferable embodiment of the inventive vehicle brake-diaphragm, a side of said vessel-form member is provided with a rolled-up portion so that it functions as a rolling film during use.

In a preferable embodiment of the inventive vehicle brake-diaphragm, said vessel-form member functioning as said rolling film has a film thickness of 0.45 to 1.6 mm.

In a preferable embodiment of the inventive vehicle brake-diaphragm, said vessel-form member functioning as said rolling film has a film thickness of 1.0 to 1.6 mm.

In a preferable embodiment of the inventive vehicle brake-specific diaphragm, said vessel-form member functioning as said rolling film is in an elliptic cylinder form.

In a preferable embodiment of the inventive vehicle brake-diaphragm, said substrate fabric is biased toward the outside of said vessel-form member upon embedding, and satisfies a relation: $t2/t1 = 2$ to $15$, where $t1$ is an outer rubber thickness of said vessel-form member with a center position of said substrate fabric where said substrate fabric is embedded in said rubber body as a reference and $t2$ is an inner rubber thickness of said vessel-form member with a position where said substrate fabric is embedded in said rubber body as a reference.

In a preferable embodiment of the inventive vehicle brake-diaphragm, the post-molding diaphragm is completely reversed to bias said substrate fabric toward the inside of said vessel-form member upon embedding.

Including a vessel-form member and a flange portion formed at a peripheral edge of an opening in said vessel-form member, wherein said vessel-form member and said flange portion are each formed of a rubber body comprising silicone rubber and a substrate fabric embedded in said rubber body, said substrate fabric comprising aramid short fibers or polyester fibers, and having a thickness of 0.25 mm or more, the inventive vehicle brake-specific diaphragm has an advantage of exerting much better durability during operation in the low-temperature area, to say nothing of durability during operation in the high-temperature and low-temperature areas.

BEST MODE FOR CARRYING OUT THE INVENTION

The best mode for carrying out the invention will now be elucidated with reference to the accompanying drawings.

Figure 1:
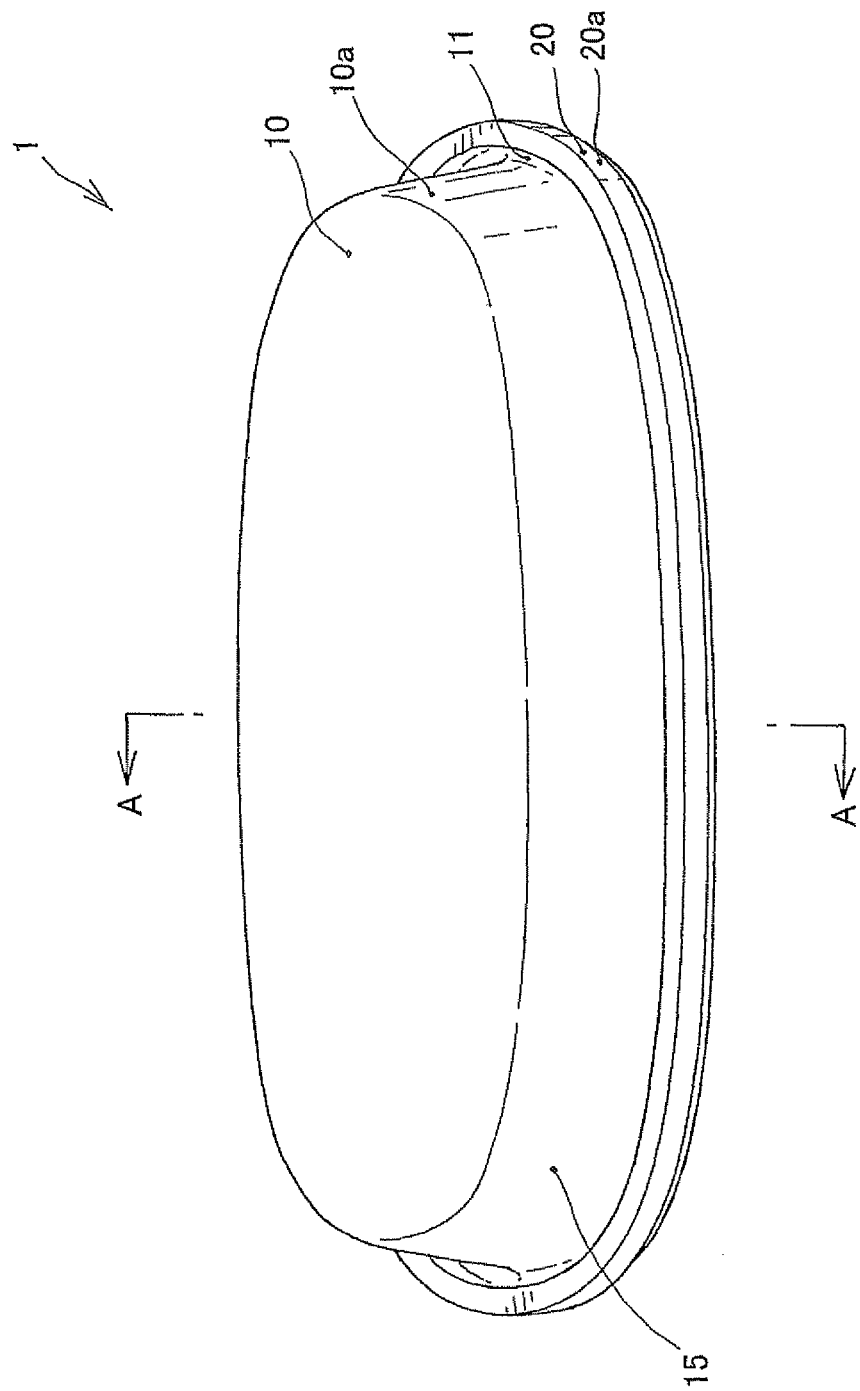
FIG. 1 is illustrative in schematic and perspective of the vehicle brake-specific diaphragm according to the invention.
Figure 2:
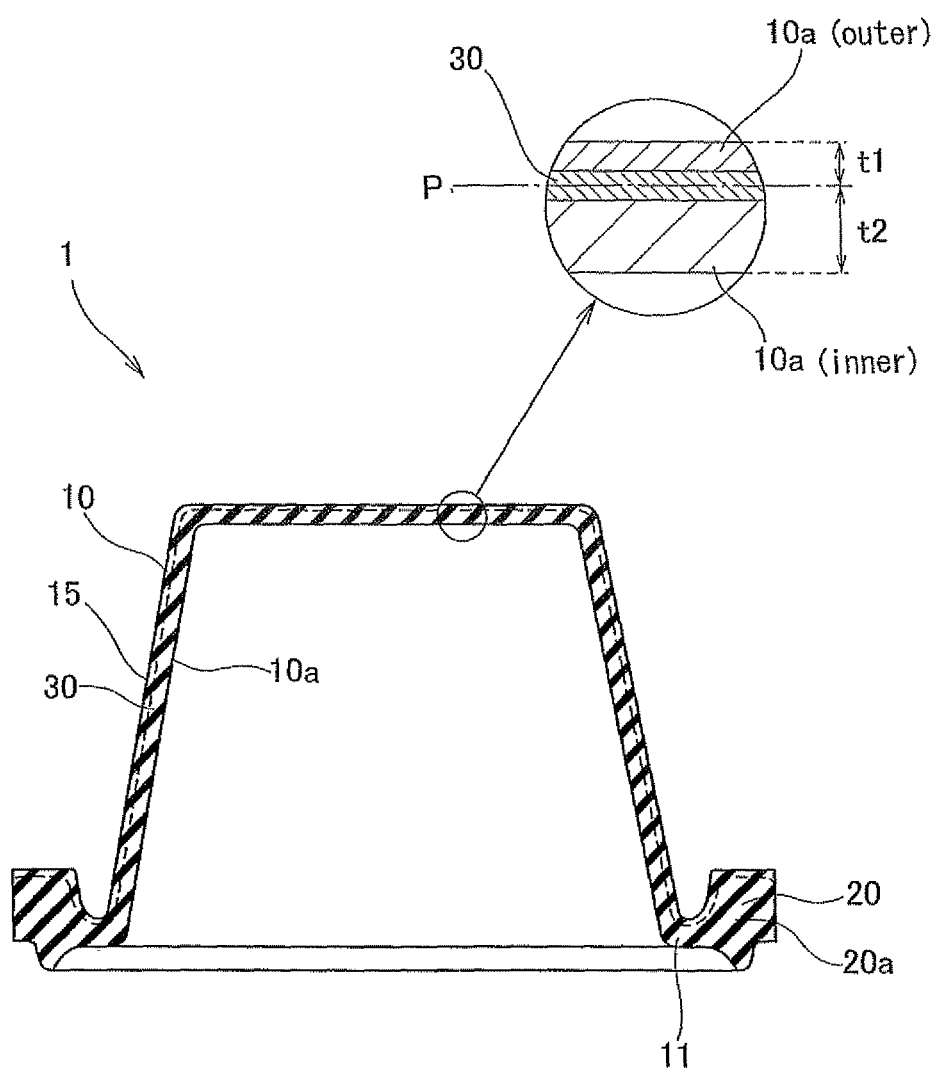
FIG. 2 is a sectional view of FIG. 1 as taken along a double action arrow A-A.
Figure 3:
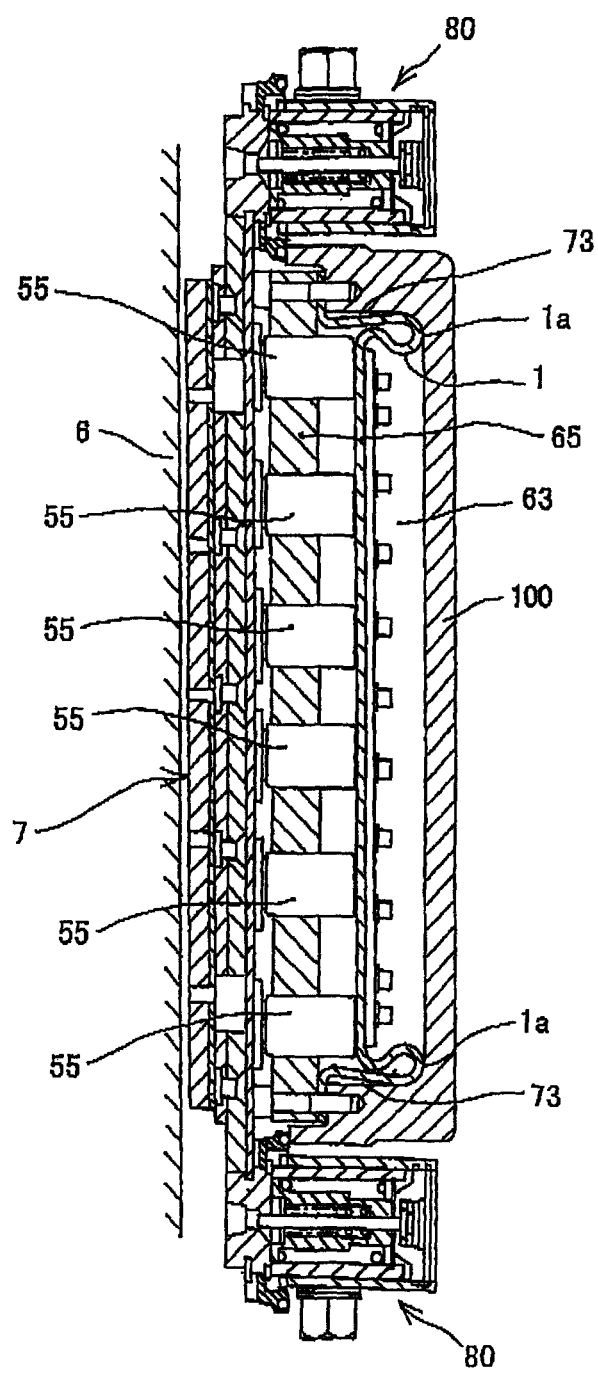
FIG. 3 is illustrative in schematic and section of an example of the inventive vehicle brake-specific diaphragm attached to a caliper brake assembly for vehicles.

FIG. 1 is illustrative in schematic and perspective of the vehicle brake-specific diaphragm according to the invention; FIG. 2 is a sectional view of FIG. 1 as taken along a double action arrow A-A; and FIG. 3 is illustrative in schematic and section of an example of the inventive vehicle brake-specific diaphragm attached to a caliper brake assembly for vehicles.

As shown in FIGS. 1 and 2, the inventive vehicle brake-specific diaphragm, indicated generally at 1, includes a vessel-form member 10 and a flange portion 20 formed contiguous to the peripheral edge 11 of the vessel-form member 10.

As shown in the sectional view of FIG. 2, the vessel-form member 10 and the flange portion 20 are formed as an integral piece constructed of a rubber body 10a, 20a, comprising silicone rubber, and a substrate fabric 30 embedded in that rubber body.

The silicone rubber is a synthetic one having its main chain comprising an organosiloxane bond, and produced typically by adding fillers to an elastic rubber material composition having a degree of polymerization of a few thousands or more followed by vulcanization with peroxides. Preference is then given to a dimethyl polysiloxane whose side chains are all methyl groups, a vinyl silicone rubber with some methyl groups substituted by vinyl groups, a phenyl silicone rubber with some methyl groups substituted by phenyl groups, a silicone fluoride rubber with alkyl fluoride groups introduced in the side chains of vinyl silicone rubber, and so on.

The substrate fabric 30 used herein comprises aramid short fibers or polyester fibers woven as a fabric. The substrate fabric 30 should have a thickness of 0.25 mm or greater, especially 0.25 to 1.0 mm, preferably 0.25 to 0.6 mm, and more preferably 0.3 to 0.4 mm. As this fabric thickness is less than 0.25 mm, it would likely make it difficult to obtain much more improved durability during operation in both the high-temperature and the low-temperature area.

The aramid fibers used for the substrate material 30 are aromatic polyimide fibers present in both meta- and para-forms. For instance, the meta-aramid fibers may be obtained as polyphenylene isophtalamide fibers by condensation polymerization of raw materials m-phenylenediamine (MPDA) and isophthalic acid dichloride (IPC). The short fibers usually refer to fibers having a length of about 38 mm to about 100 mm. Usually, several such fibers are lined up and bundled up into an elongate single yarn (the so-called spinning), and several such single yarns are twisted to a suitable, stable thickness for use.

The substrate fabric 30 made up as a fabric comprising such aramid short fibers should preferably be in a "plain woven" fabric texture form in particular. The plain woven fabric texture, because of being tough and of nerve, is best suited for being embedded in the rubber body for use as the diaphragm.

It is here to be noted that although another fabric typified by a "twill woven" fabric texture has a feature of being soft and less wrinkled up, it would be a less-than-preferable choice in terms of being embedded in the rubber body thereby improving durability as contemplated herein. Although yet another fabric typified by a "satin woven" fabric texture has a feature of being soft to the touch and glossy, it would be a less-than-preferable choice as is the case with the above twill weave, in terms of being embedded in the rubber body thereby improving durability as contemplated herein.

The polyester fibers used for the substrate fabric 30, for instance, may be synthetic ones obtained by the melt spinning of polyesters such as polyethylene terephthalate, either in short fiber form or in long fiber form.

The substrate fabric 30 made up as a fabric composed of such polyester fibers should preferably be in a "plain woven" fabric texture form in particular. The plain woven fabric texture, because of being tough and of nerve, is best suited for being embedded in the rubber body for use as the diaphragm. As already mentioned, the substrate fabric should have a thickness of 0.25 mm or more, especially 0.25 to 1.0 mm, preferably 0.25 to 0.6 mm, and more preferably 0.3 to 0.4 mm. As this fabric thickness is less than 0.25 mm, it would likely make it difficult to obtain much more improved durability during operation in both the high-temperature and the low-temperature area.

Referring then to the side 15 of the vessel-form member 10 forming a part of the inventive diaphragm, it is rolled up and functions as a rolling film as the diaphragm is built in a vehicle-specific caliper brake assembly, as shown in FIGS. 1 and 2. Generally, this rolled-up portion rolls smoothly and non-frictionally from a piston wall to a cylinder wall, both walls being externally provided to form a part of the vehicle-specific caliper brake assembly. The state of this rolled-up portion will be explained later with reference to FIG. 3.

The film thickness of the vessel-form member 10 including the portion that functions as a rolling film should be 0.45 to 1.6 mm, and preferably 1.0 to 1.6 mm. The film thickness of this vessel-form member 10 is usually determined while taking the thickness of the embedded substrate fabric 30 into account too. As this film thickness is less than 0.45 mm, it would likely make it difficult to obtain good enough durability durability operation in both the high-temperature and the low-temperature area.

While there is no specific limitation on the configuration of the vessel-form member 10 including the portion functioning as the aforesaid rolling film, it should preferably be configured in an elliptical cylinder form, as shown in FIG. 1. This is to make sure the brake mechanism of the caliper brake (disc brake) works effectively.

The substrate fabric 30 embedded as shown in FIG. 2 is biased toward the outside of the vessel-form member 10, as can be clearly seen from the sectional view. More specifically, the substrate fabric 30 is positioned upon embedding in such a way as to satisfy the relation: $t2/t1=2$ to 15 or, more preferably, 2 to 13 where t1 is the outer rubber thickness of the vessel-form member 10 including the half thickness of the substrate fabric with the center position P of the substrate fabric embedded in the rubber body as a reference, and t2 is the inner rubber thickness of the vessel-form member 10 including the half thickness of the substrate fabric with the center position P of the substrate fabric embedded in the rubber body as a reference. This is to bias the rubber thickness in such a way as to allow a working fluid (e.g., compressed air) for the actuator to act on a thicker rubber side. Then, the diaphragm is built in the brake assembly such that such action occurs.

It is here to be noted that although depending on a difference in how to mount or use the post-molding diaphragm, it may be completely reversed and mounted to the brake assembly rather than used just as it is. This, too, is to permit the working fluid (e.g., compressed air) for the actuator to act on a thicker rubber side.

Explanation of an Example of Manufacturing the Inventive Vehicle Brake-Specific Diaphragm The inventive vehicle brake-specific diaphragm incorporating the substrate fabric may generally be manufactured through the following steps.

First, a mold comprising a bottom force and a top force is provided.

The bottom force includes a convexity primarily for forming a cavity of elliptical cylinder shape conforming to the configuration of the vessel-form member 10, and the top force that pairs up with the bottom force includes a concavity primarily for forming a cavity of elliptical cylinder shape. As the top and bottom forces are integrated together, it causes a hat-like (brimmed oval hat-like) cavity to be formed between them and at a given separation.

In the mold having such structure, a rubber preform of unvulcanized rubber is first formed. For the formation of the rubber preform of unvulcanized rubber, for instance, a sheetlike form of unvulcanized rubber is attached to the cavity surface of the bottom force, and the bottom and top forces are then engaged together for pressurization. In this case, the temperature and pressure of the mold are set such that the vulcanization of unvulcanized rubber does not make progress.

As the upper force is disengaged after the formation of such a rubber preform, a hat-like rubber preform of unvulcanized rubber remains formed on the bottom force. A substrate fabric comprising plain woven aramid short fibers is applied onto this rubber preform of unvulcanized rubber. Thereafter, the bottom and top forces are integrated together to carry out thermal vulcanization while the substrate fabric is embedded in the rubber preform. It is here to be noted that the substrate fabric should preferably be preliminarily formed in conformity to the configuration of the rubber preform.

The bottom and top forces are separated from each other to remove the inventive diaphragm molded inside. After removal, usually, the diaphragm is punched out in elliptical shape to put the flange portion 20 in right form.

Attachment of the Vehicle Brake-Specific Diaphragm to a Vehicle Brake

FIG. 3 is illustrative in section of one example of keeping the inventive vehicle brake-specific diaphragm attached to a vehicle-specific caliper brake assembly.

The reason that FIG. 3 in particular is presented herein is to schematically illustrate how to install the inventive diaphragm, and clearly illustrate that when the side 15 of the vessel-form member 10 of the inventive diaphragm is built in the vehicle-specific caliper brake assembly, it is provided with the rolled-up portion, functioning as a rolling film.

Referring to FIG. 3, the so-called floating type vehicle-specific caliper brake assembly includes a diaphragm actuator for pressing a brake shoe 7 against a disc 6 opposing to it. That diaphragm actuator comprises a diaphragm 1 attached to a caliper body 100, a diaphragm chamber 63 partitioned by this diaphragm 1, a plurality of pistons 55 interposed between the diaphragm 1 and the brake shoe 7 to transmit the movement of the diaphragm 1 to the brake shoe 7, and a piston guide frame 65 adapted to support the respective pistons in a slidable manner. Upon braking, an air pressure guided into the diaphragm chamber 63 causes the diaphragm 1 to inflate so that the respective pistons 55 are operable to press the brake shoe 7 against the disc 6.

And the rolled-up portion 1a of the diaphragm 1 is formed between the outermost piston and a cylinder inner wall 73 forming the diaphragm chamber 63, functioning as a rolling film. Note here that reference numeral 80 is a return spring structure.

Specific Examples

The present invention will now be explained at greater length with reference to some specific examples.

Three such rubber materials were provided for the rubber materials for making up the rubber bodies 10a and 20a.
(R-1): Silicone Rubber (made by Shin-Etsu Chemical Co., Ltd. and marketed in the trade name of KE-555-U)
(R-2): Fluororubber (made by DuPont and marketed in the trade name of Viton GLT)
(R-3): EPDM (made by Mitsui Chemicals, Incorporated and marketed in the trade name of EPT3072EHM)
(R-4): EPDM (made by Sumitomo Chemical Company Limited and marketed in the trade name of Esplene 532)

Substrate fabric materials comprising such fibers as set forth below were provided as the substrate fabrics to be embedded in the rubber bodies.
(K-1): Aramid Short Fibers (made by Teijin Limited and marketed in the trade name of Conex)
(Substrate Fabric of Plain-Woven Structure of 0.3 Mm in Thickness)
(K-2): Aramid Long Fibers (made by DuPont) (Substrate fabric of plain-woven structure of 0.17 mm in thickness)
(K-3): Polyester (made by Teijin Limited and marketed in the trade name of Tetoron)
(Substrate Fabric of Plain-Woven Structure of 0.3 Mm in Thickness)

According to such combinations as set forth in Table 1 given later, each of the above woven substrate fabrics was embedded in each of the above rubber layers to prepare a 62 mm test sample, in which the rubber thickness (sample thickness) including the substrate fabric was set at 0.45 mm.

Upon embedding, the substrate fabric was biased to almost all over one surface of the rubber layer, and had a pressure surface defined by a thicker rubber layer surface. When the substrate fabric was 0.3 mm in thickness, t2/t1 become about 2.0, and when the substrate fabric was 0.17 mm in thickness, t2/t1 became about 4.3.

Each of these test samples was put through durability testing in (a) a low-temperature area of −40° C., (b) a high-temperature area of 160° C., and (c) a normal-temperature area of 23° C.

The durability testing was carried out on an experimental cylinder apparatus comprising a piston of 30 mm in diameter, a cylinder of 50 mm in diameter and a mechanism for forcing the piston into the cylinder in a continuously repetitive manner. With the test sample sandwiched between the piston and the cylinder, the piston was forced into the cylinder in a continuously repetitive manner to count how many times the piston could be forced in until the test piece broke down. The testing pressure was 600 kPa.

The results are tabulated in Table 1.

TABLE 1

| Sample No. | Rubber Material | Substrate Fabric | Average Durability Test Cycles | | |
|---|---|---|---|---|---|
| | | | −40° C. | 160° C. | 23° C. |
| (Inv.) 1 | (R-1) | (K-1) | ≥600,000 | 22,107 | 124,705 |
| (Comp.) 2 | (R-1) | (K-2) | 80 | 846 | 4,714 |
| (Comp.) 3 | (R-2) | (K-1) | 180 | 3,093 | 16,441 |
| (Comp.) 4 | (R-3) | (K-3) | 19,050 | 1,554 | 35,208 |
| (Inv.) 5 | (R-1) | (K-3) | 157,126 | — | 46,067 |
| (Comp.) 6 | (R-4) | (K-3) | 28,822 | — | 42,788 |

R-1: Silicone rubber
R-2: Fluororubber
R-3: EPDM
R-4: EPDM
K-1: Plain woven aramid short fibers of 0.3 mm in thickness
K-2: Plain woven aramid long fibers of 0.17 mm in thickness
K-3: Plain woven polyester fibers of 0.3 mm in thickness It is here to be noted that the above (R-4): EPDM (made by Sumitomo Chemical Company Limited and marketed in the trade name of Esplene 532) is a rubber of the grade that is superior in low-temperature durability to the above (R-1): Silicone Rubber (made by Shin-Etsu Chemical Co., Ltd. and marketed in the trade name of KE-555-U) (as confirmed by the comparison of low-temperature durability by Gehman's torsion testing). In other words, (R-4) is a rubber superior to (R-1): Silicone Rubber in terms of low-temperature durability.

Referring to the compatibility of the polyester fibers for the substrate fabric on the low-temperature durability effect, however, it has been found, surprisingly and contrary to expectation, from the results of experimentation of Sample Nos. 5 and 6 that (R-1): Silicone Rubber is superior to (R-4): EPDM. Note here that in the experiments of Sample Nos. 5 and 6, no durability testing was carried out in the high-temperature area of 160° C., especially because of the development of a vehicle brake-specific diaphragm focused on the use of a low-cost substrate fabric for improvements in the desired low-temperature durability.

The advantages of the present invention would be appreciated from the above results. That is, the vehicle brake-specific diaphragm according to the present invention includes a vessel-form member and a flange portion formed at a peripheral edge of an opening in said vessel-form member, wherein said vessel-form member and said flange portion are each formed of a rubber body comprising silicone rubber and a substrate fabric embedded in said rubber body, said substrate fabric comprising aramid short fibers or polyester fibers, and having a thickness of 0.25 mm or more, so that it does not only have durability during operation in both the high-temperature and the normal-temperature area but also exerts much better durability during operation in the low-temperature area.

APPLICABILITY TO THE INDUSTRY

The present invention could find applications in the industry using diaphragm rubber compositions and diaphragms using them as well as in the railway vehicle industry.

I claim:

1. A vehicle brake-specific diaphragm including a vessel-form member and a flange portion formed at a peripheral edge of an opening in said vessel-form member, wherein:
said vessel-form member and said flange portion are each formed of a rubber body comprising silicone rubber and a substrate fabric embedded in said rubber body,
said substrate fabric comprising aramid short fibers, and having a thickness of 0.3 mm.

2. The vehicle brake-specific diaphragm as recited in claim 1, wherein said substrate fabric comprises a plain woven fabric texture.

3. The vehicle brake-specific diaphragm as recited in claim 1, wherein a side of said vessel-form member is provided with a rolled-up portion so that it functions as a rolling film during use.

4. The vehicle brake-specific diaphragm as recited in claim 3, wherein said vessel-form member functioning as said rolling film has a film thickness of 0.45 to 1.6 mm.

5. The vehicle brake-specific diaphragm as recited in claim 3, wherein said vessel-form member functioning as said rolling film has a film thickness of 1.0 to 1.6 mm.

6. The vehicle brake-specific diaphragm as recited in claim 3, wherein said vessel-form member functioning as said rolling film is in an elliptic cylinder form.

7. The vehicle brake-specific diaphragm as recited in claim 1, wherein upon embedding, said substrate fabric is biased toward an outside of said vessel-form member, and satisfies a relation: $t2/t1=2$ to $15$, where $t1$ is an outer rubber thickness of said vessel-form member with a center position of said substrate fabric where said substrate fabric is embedded in said rubber body as a reference and $t2$ is an inner rubber thickness of the said vessel-form member with a position where said substrate fabric is embedded in said rubber body as a reference.

8. The vehicle brake-specific diaphragm as recited in claim 7, wherein a post-molding diaphragm is completely reversed to bias said substrate fabric toward an inside of said vessel-form member upon embedding.

9. A vehicle brake-specific diaphragm including a vessel-form member and a flange portion formed at a peripheral edge of an opening in said vessel-form member, wherein:
said vessel-form member and said flange portion are each formed of a rubber body comprising silicone rubber and a substrate fabric embedded in said rubber body,
said substrate fabric comprising polyester fibers, and having a thickness of 0.3 mm.

10. The vehicle brake-specific diaphragm as recited in claim 9, wherein said substrate fabric comprises a plain woven fabric texture.

11. The vehicle brake-specific diaphragm as recited in claim 9, wherein a side of said vessel-form member is provided with a rolled-up portion so that it functions as a rolling film during use.

12. The vehicle brake-specific diaphragm as recited in claim 11, wherein said vessel-form member functioning as said rolling film has a film thickness of 0.45 to 1.6 mm.

13. The vehicle brake-specific diaphragm as recited in claim 11, wherein said vessel-form member functioning as said rolling film has a film thickness of 1.0 to 1.6 mm.

14. The vehicle brake-specific diaphragm as recited in claim 11, wherein said vessel-form member functioning as said rolling film is in an elliptic cylinder form.

15. The vehicle brake-specific diaphragm as recited in claim 9, wherein upon embedding, said substrate fabric is biased toward an outside of said vessel-form member, and said substrate fabric satisfies a relation: $t2/t1=2$ to $15$, where $t1$ is an outer rubber thickness of said vessel-form member with a center position of said substrate fabric where said substrate fabric is embedded in said rubber body as a reference and $t2$ is an inner rubber thickness of the said vessel-form member with a position where said substrate fabric is embedded in said rubber body as a reference.

16. The vehicle brake-specific diaphragm as recited in claim 15, wherein upon embedding, a post-molding diaphragm is completely reversed to bias said substrate fabric toward an inside of said vessel-form member upon embedding.

* * * * *